US012748656B2

(12) United States Patent
Nguyen et al.

(10) Patent No.: US 12,748,656 B2
(45) Date of Patent: *Sep. 29, 2026

(54) PCIe DPC SMI STORM PREVENTION SYSTEM

(71) Applicant: Dell Products L.P., Round Rock, TX (US)

(72) Inventors: Tuyet-Huong Thi Nguyen, Cedar Park, TX (US); Wei Liu, Austin, TX (US); Austin Patrick Bolen, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 37 days.

This patent is subject to a terminal disclaimer.

(21) Appl. No.: 18/966,305

(22) Filed: Dec. 3, 2024

(65) Prior Publication Data

US 2025/0094272 A1 Mar. 20, 2025

Related U.S. Application Data

(63) Continuation of application No. 18/303,160, filed on Apr. 19, 2023, now Pat. No. 12,197,280.

(51) Int. Cl.
*G06F 11/07* (2006.01)
*G06F 11/30* (2006.01)

(52) U.S. Cl.
CPC ........ *G06F 11/0793* (2013.01); *G06F 11/076* (2013.01); *G06F 11/3075* (2013.01)

(58) Field of Classification Search
CPC .... G06F 11/076; G06F 11/0772; G06F 11/30; G06F 11/0793; G06F 13/24
See application file for complete search history.

(56) References Cited

U.S. PATENT DOCUMENTS

| | | | | |
|---|---|---|---|---|
| 2014/0173152 | A1* | 6/2014 | Kegel | G06F 21/74 710/269 |
| 2016/0246739 | A1* | 8/2016 | Tsirkin | G06F 13/4221 |
| 2017/0091013 | A1* | 3/2017 | Tallam | G06F 11/0745 |
| 2022/0334911 | A1* | 10/2022 | Zhang | G06F 11/0793 |
| 2023/0281080 | A1* | 9/2023 | Wu | G06F 11/076 714/43 |

* cited by examiner

*Primary Examiner* — Yolanda L Wilson
(74) *Attorney, Agent, or Firm* — Joseph Mencher

(57) ABSTRACT

A Peripheral Component Interconnect express (PCIe) Downstream Port Containment (DPC) System Management Interrupt (SMI) storm prevention system includes a Basic Input/Output System (BIOS) subsystem coupled to a first PCIe device. In response to an error being experienced in the first PCIe device and causing the first PCIe device to perform DPC operations, the BIOS subsystem receives a plurality of SMIs that are each configured to begin a System Management Mode (SMM). The BIOS subsystem tracks a number of the plurality of SMIs in a BIOS database and determines when the number of the plurality of SMIs has reached a DPC SMI storm threshold. In response to the number of the plurality of SMIs reaching the DPC SMI storm threshold, the BIOS subsystem prevents use of a link to the first PCIe device and prevents an operating system from performing recovery operations to recover the first PCIe device from the error.

20 Claims, 13 Drawing Sheets

PCIe DPC SMI STORM PREVENTION SYSTEM

CROSS-REFERENCE TO RELATED APPLICATION

The present application is a continuation of U.S. application Ser. No. 18/303,160, filed Apr. 19, 2023, the disclosure of which is incorporated by reference herein in its entirety.

BACKGROUND

The present disclosure relates generally to information handling systems, and more particularly to preventing System Management Interrupt (SMI) storms due to Peripheral Component Interconnect express (PCIe) Downstream Port Containment (DPC) operations in information handling systems.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Many information handling systems such as, for example, server devices, desktop computing devices, laptop/notebook computing devices, tablet computing devices, mobile phones, and/or other computing devices known in the art, include Peripheral Component Interconnect (PCIe) devices to, for example, add functionality to those computing devices. In some situations, PCIe devices in computing devices can experience errors that must be handled by the computing device. For example, errors experienced by a PCIe device included in a computing device may be conventionally handled via Downstream Port Containment (DPC) operations that cause a chipset in the computing device to disable the link to the PCIe device following the error in order to prevent the potential spread of data corruption and enable recovery of the PCIe device (e.g., when recovery operations are supported by the operating system). The PCIe DPC error handling operations may also cause the chipset in the computing device to generate a System Management Interrupt (SMI) that is configured to cause the computing device to enter a System Management Mode (SMM), with a DPC SMI handler in the BIOS operating in the SMM to log the error experienced by the PCIe device to a System Event Log (SEL), and provide an instruction to the operating system to perform recovery operations to attempt to recover the PCIe device from the error. However, such conventional PCIe DPC error handling operations can raise issues.

For example, in the event the error in the PCIe device is a "hard" error such as an error due to malfunctioning hardware (e.g., a memory chip failure) in the PCIe device and/or other hard PCIe device errors known in the art, the computing device can become stuck in a "DPC recovery loop" of the PCIe DPC error handling operations discussed above that causes an "SMI storm" in which each time the operating system recovers the PCIe device, the error occurs again, and the DPC operations again cause the chipset in the computing device to generate the SMI. Such SMI storms can negatively impact the performance of the computing device due to the operation of the cores in the processing system of the computing device (e.g., Central Processing Unit (CPU) cores in a CPU) being repeatedly suspended in the SMM in response to each SMI without knowledge of the operating system, resulting in a repeated SMI/SMM entry/exit latency that scales along with the number of cores in the processing system, and that can result in operating system runtime issues such as network packet loss and/or other SMI/SMM entry/exit latency issues that would be apparent to one of skill in the art in possession of the present disclosure.

Accordingly, it would be desirable to provide a PCIe DPC error handling system that addresses the issues discussed above.

SUMMARY

According to one embodiment, an Information Handling System (IHS) includes a processing system; and a memory system that is coupled to the processing system and that includes instructions that, when executed by the processing system, cause the processing system to provide a Basic Input/Output System (BIOS) engine that is configured to: receive, in response to an error being experienced in a first PCIe device and causing the first PCIe device to perform Downstream Port Containment (DPC) operations, a plurality of System Management Interrupts (SMIs) that are each configured to begin a System Management Mode (SMM); track, in a BIOS database, a number of the plurality of SMIs; and determine that the number of the plurality of SMIs has reached a DPC SMI storm threshold and, in response, prevent use of a link to the first PCIe device and prevent an operating system from performing recovery operations to recover the first PCIe device from the error.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
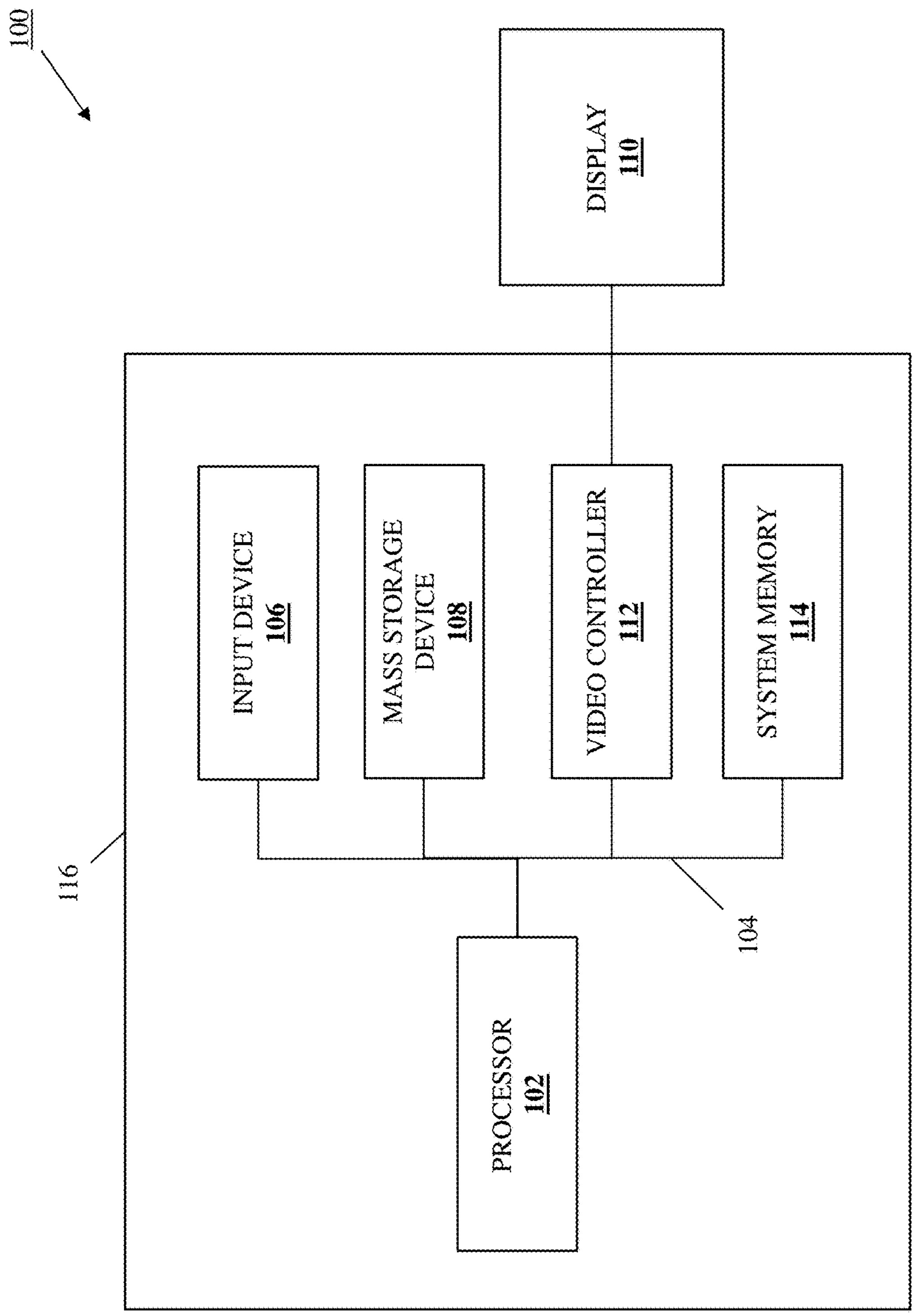
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
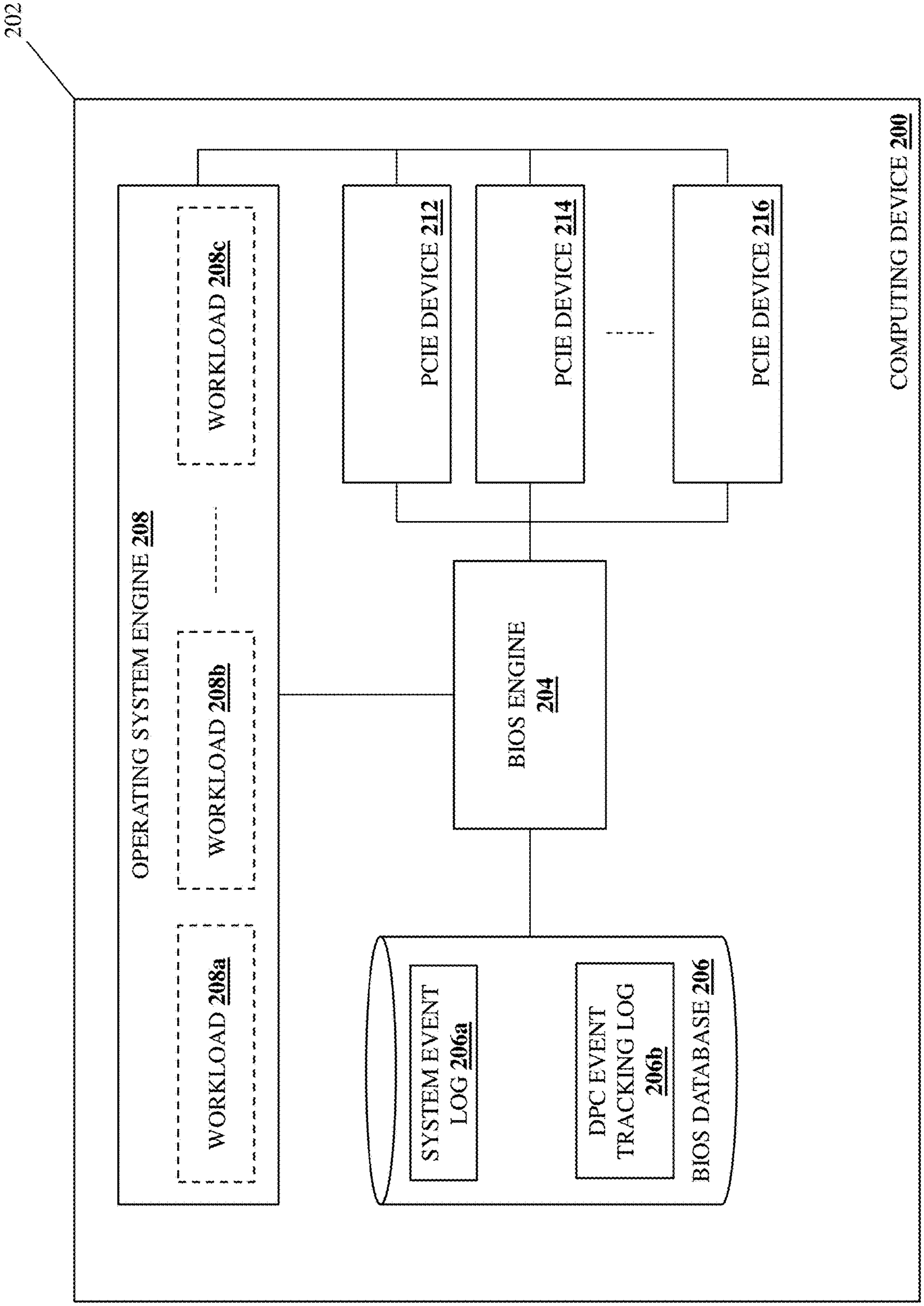
FIG. 2 is a schematic view illustrating an embodiment of a computing device that may include the PCIe DPC SMI storm prevention system of the present disclosure.

Referring now to FIG. 2, an embodiment of a computing device 200 is illustrated that may include the PCIe DPC SMI storm prevention system of the present disclosure. In an embodiment, the computing device 200 may be provided by the IHS 100 discussed above with reference to FIG. 1 and/or may include some or all of the components of the IHS 100, and in specific examples may be provided by server devices, desktop computing devices, laptop/notebook computing devices, tablet computing devices, mobile phones, and/or other computing devices known in the art. Furthermore, while illustrated and discussed as being provided by particular computing devices, one of skill in the art in possession of the present disclosure will recognize that the functionality of the computing device 200 discussed below may be provided by other devices that are configured to operate similarly as the computing device 200 discussed below. In the illustrated embodiment, the computing device 200 includes a chassis 202 that houses the components of the computing device 200, only some of which are illustrated and described below.

For example, the chassis 202 may house a Basic Input/Output System (BIOS) processing system (not illustrated, but which may include a processor similar to the processor 102 discussed above with reference to FIG. 1) and a BIOS memory system (not illustrated, but which may include a memory similar to the memory 114 discussed above with reference to FIG. 1) that is coupled to the BIOS processing system and that includes instructions that, when executed by the BIOS processing system, cause the BIOS processing system to provide a BIOS engine 204 that is configured to provide a BIOS and/or otherwise perform the functionality of the BIOS engines, BIOS subsystems, and/or computing devices discussed below. To provide a specific example, the BIOS engine 204 may be provided by BIOS firmware, although one of skill in the art in possession of the present disclosure will appreciate that the functionality of the BIOS engine 204 may be provided by other processing/memory system combinations while remaining within the scope of the present disclosure as well. Furthermore, while illustrated and described as a "BIOS" engine that provides a "BIOS", one of skill in the art in possession of the present disclosure will appreciate how the BIOS engine 204 may be provided by a Unified Extensible Firmware Interface (UEFI) engine that may be provided to replace the BIOS engine 204 in the computing device 200 and provide a UEFI according to UEFI specifications that define an architecture of platform firmware used for booting and its interface for interaction with an operating system.

The chassis 202 may also house a BIOS storage system (not illustrated, but which may include a storage similar to the storage 108 discussed above with reference to FIG. 1) that is coupled to the BIOS engine 204 (e.g., via a coupling between the BIOS storage system and the BIOS processing system) and that includes a BIOS database 206 that is configured to store a System Event Log (SEL) 206_a_ and a DPC event tracking log 206_b_ in the embodiments illustrated and discussed below, and that one of skill in the art in possession of the present disclosure will appreciate may store any of the information utilized by the BIOS engine 204 discussed below. The chassis 202 may also house a central processing system (not illustrated, but which may include a Central Processing Unit (CPU) similar to the processor 102 discussed above with reference to FIG. 1) and a central memory system (not illustrated, but which may include a memory similar to the memory 114 discussed above with reference to FIG. 1) that is coupled to the central processing system and that includes instructions that, when executed by the central processing system, cause the central processing system to provide an operating system engine 208 that is configured to provide an operating system in the computing device 200 that provides for the performance of a plurality of workloads 208*a*, 208*b*, and up to 208*c* in the illustrated embodiment, and that one of skill in the art in possession of the present disclosure will appreciate may be configured to provide for the performance of any of the functionality of the operating system engines and/or computing devices discussed below.

The chassis 202 may also house a plurality of PCIe devices 212, 214, and up to 216 that are each coupled to the BIOS engine 204 (e.g., via coupling(s) between the PCIe devices 212-216 and the BIOS processing system discussed above) and that may each include a variety of PCIe components depending on the type of that PCIe device. For example, a Non-Volatile Memory express (NVMe) storage device that may provide any of the PCIe devices 214-216 may include processing systems, memory systems, storage systems, and/or other NVMe storage device components that would be apparent to one of skill in the art in possession of the present disclosure. However, while a specific computing device 200 has been illustrated and described, one of skill in the art in possession of the present disclosure will recognize that computing devices (or other devices operating according to the teachings of the present disclosure in a manner similar to that described below for the computing device 200) may include a variety of components and/or component configurations for providing conventional computing device functionality, as well as the PCIe DPC SMI storm prevention functionality discussed below, while remaining within the scope of the present disclosure as well.

Figure 3:
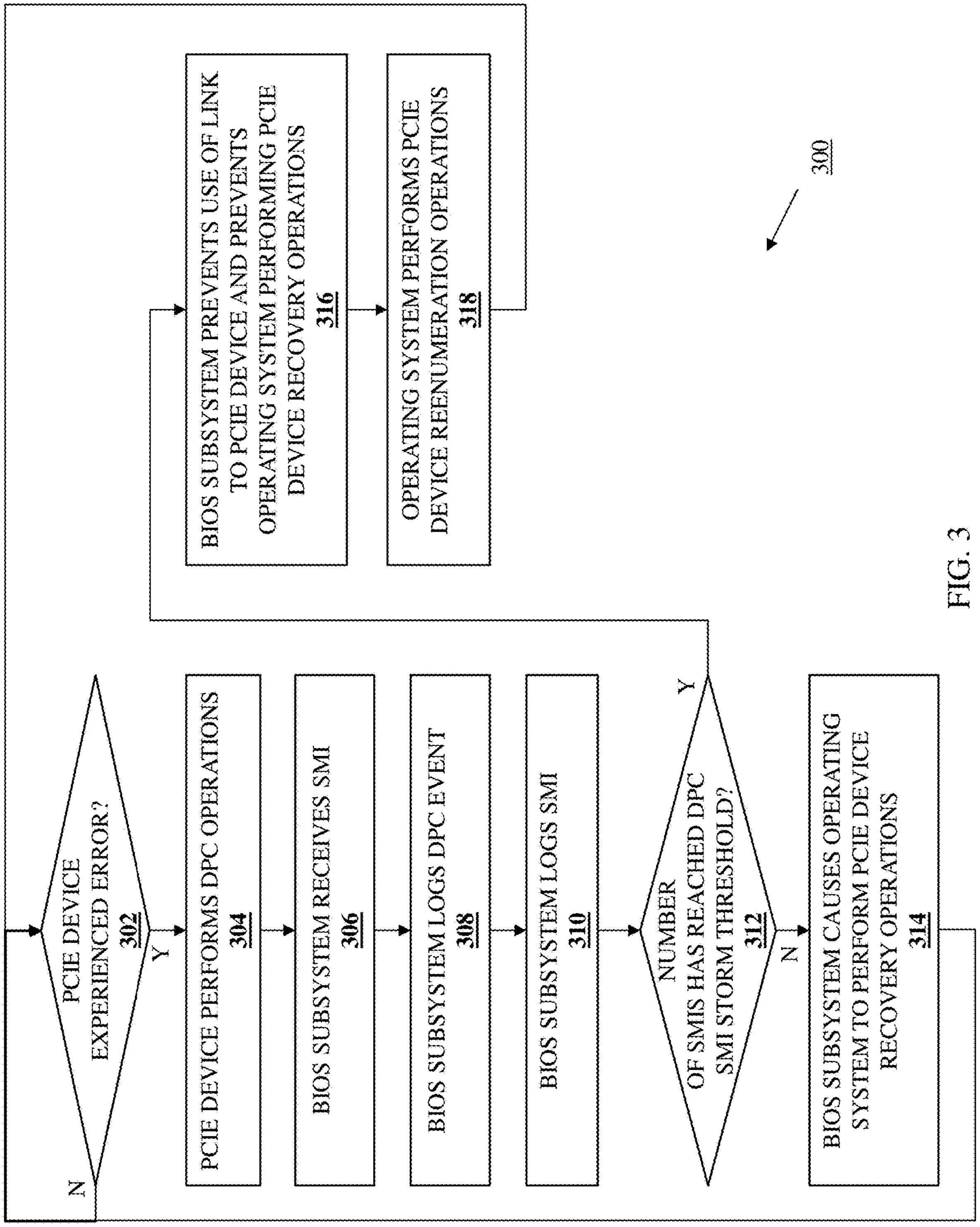
FIG. 3 is a flow chart illustrating an embodiment of a method for preventing SMI storms due to PCIe DPC operations in a computing device.

Referring now to FIG. 3, an embodiment of a method 300 for preventing System Management Interrupt (SMI) storms due to Peripheral Component Interconnect express (PCIe) Downstream Port Containment (DPC) operations in a computing device is illustrated. As discussed below, the systems and methods of the present disclosure track a number of SMIs received as part of DPC operations by a PCIe device, and disable a link to that PCIe device while preventing further recovery operations on the PCIe device by an operating system in the event that number of SMIs exceeds a threshold. For example, the PCIe DPC SMI storm prevention system of the present disclosure may include a BIOS subsystem coupled to a first PCIe device. In response to an error being experienced in the first PCIe device and causing the first PCIe device to perform DPC operations, the BIOS subsystem receives a plurality of SMIs that are each configured to begin a SMM. The BIOS subsystem tracks a number of the plurality of SMIs in a BIOS database and determines when the number of the plurality of SMIs has reached a DPC SMI storm threshold. In response to the number of the plurality of SMIs reaching the DPC SMI storm threshold, the BIOS subsystem prevents use of a link to the first PCIe device and prevents an operating system from performing recovery operations to recover the first PCIe device from the error. As such, DPC recovery loops that can result in SMI storms are prevented, thus eliminating associated operating system issues.

The method 300 begins at decision block 302 where the method 300 proceeds depending on whether a PCIe device has experienced an error. As will be appreciated by one of skill in the art in possession of the present disclosure, any of the PCIe devices 212-216 in the computing device 200 may experience an error that may include any of a variety of non-fatal/correctable or fatal/uncorrectable PCIe device errors known in the art. In some of the examples discussed below, the error in the PCIe device 214 is a "hard" error such as an error due to malfunctioning hardware (e.g., a memory chip failure) in the PCIe device and/or other hard PCIe device errors known in the art, although other errors will fall within the scope of the present disclosure as well. If, at decision block 302, no PCIe device has experienced an error, the method 300 returns to decision block 302. As such, the method 300 may loop until an error occurs in a PCIe device.

Figure 4A:
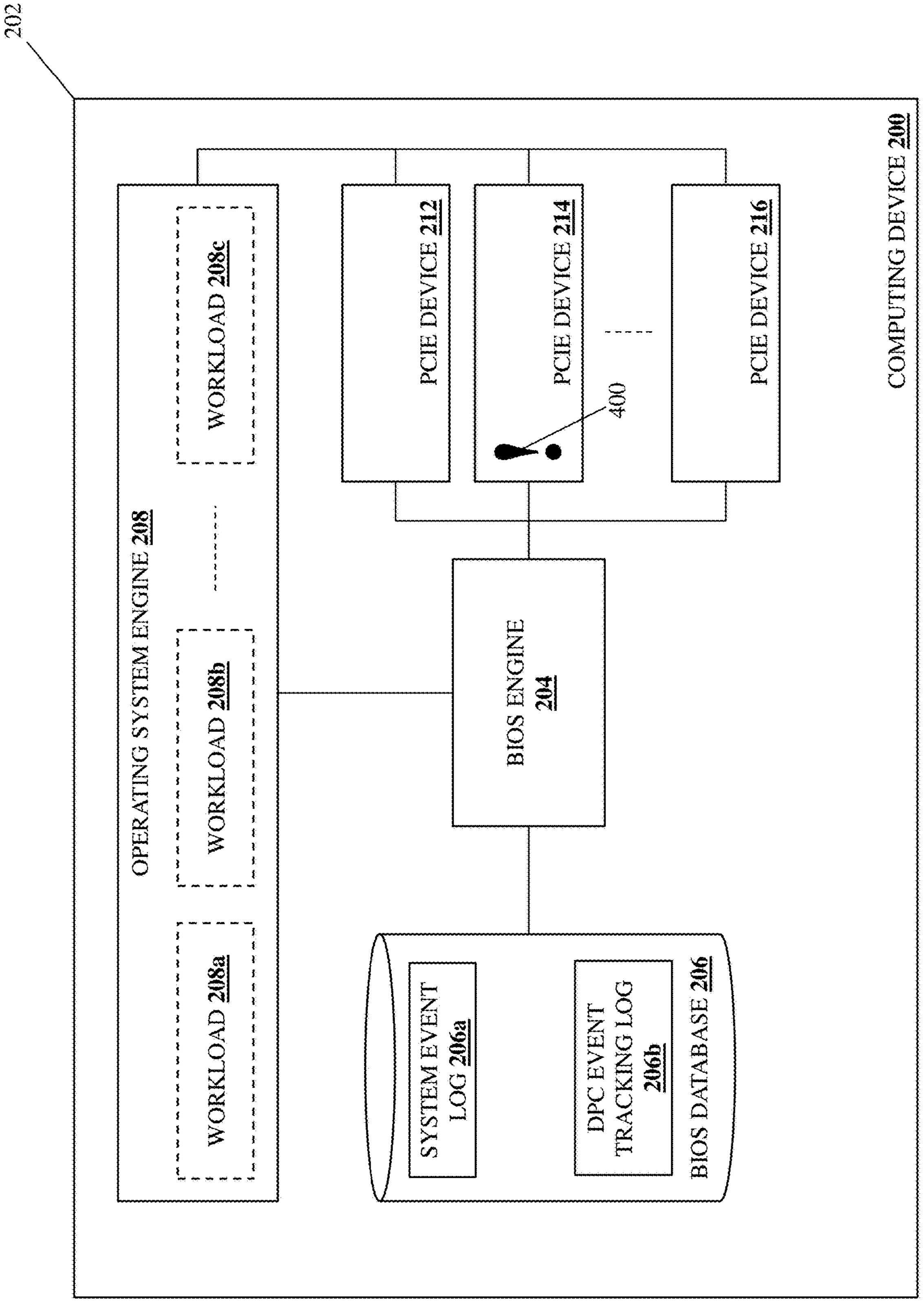
FIG. 4A is a schematic view illustrating an embodiment of the computing device of FIG. 2 operating during the method of FIG. 3.
Figure 4B:
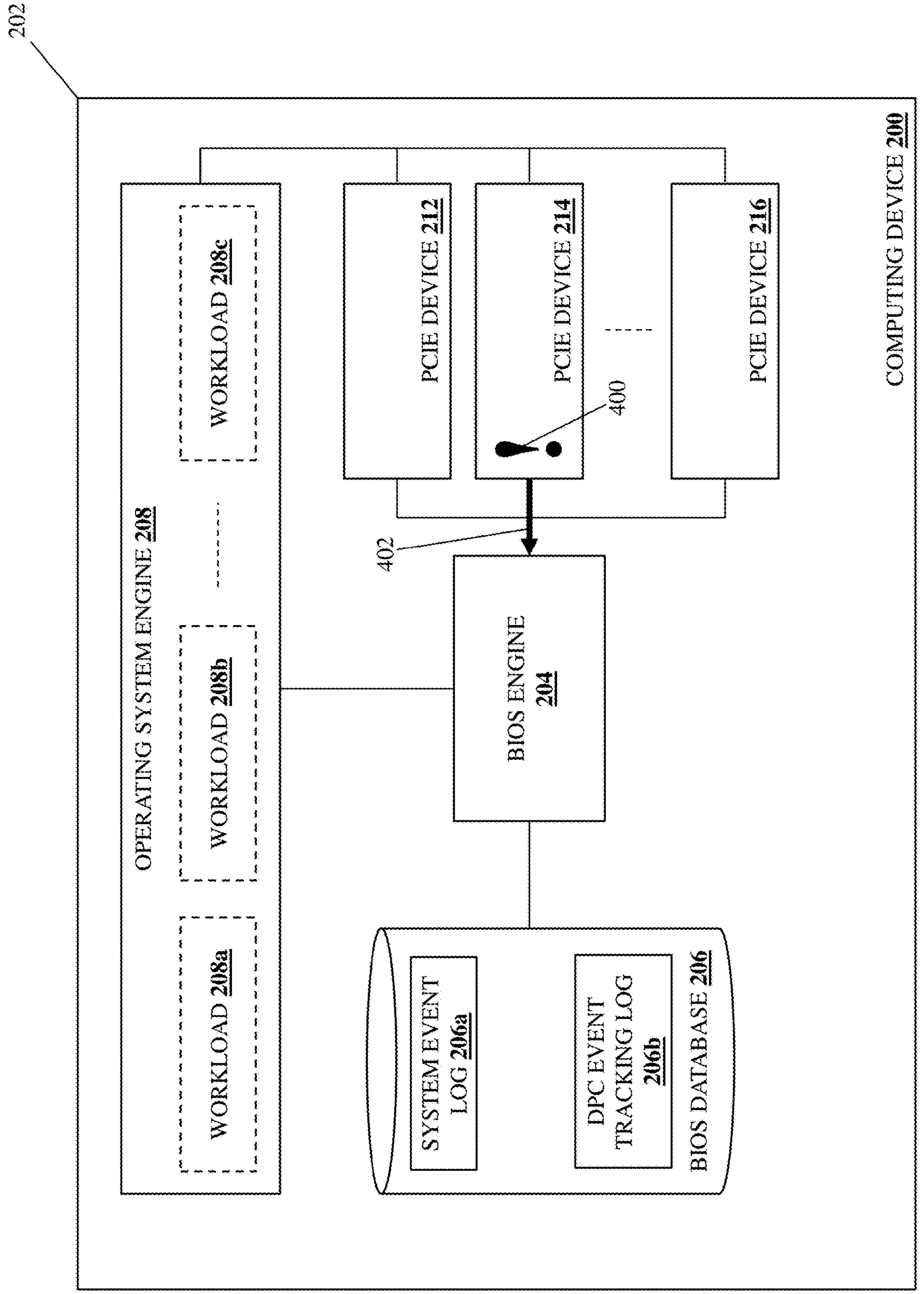
FIG. 4B is a schematic view illustrating an embodiment of the computing device of FIG. 2 operating during the method of FIG. 3.

If, at decision block 302, a PCIe device experiences an error, the method 300 proceeds to block 304 where the PCIe device performs DPC operations. With reference to FIG. 4A, in an embodiment of block 302, the PCIe device 214 in the computing device 200 may experience an error (e.g., as indicated by element 400 in FIG. 4) that may include any of the non-fatal/correctable or fatal/uncorrectable PCIe device errors discussed above. With reference to FIG. 4B, in response to the PCIe device 214 experiencing the error at block 302, the PCIe device 214 in the computing device 200 may perform DPC operations 402 that one of skill in the art in possession of the present disclosure will appreciate may provide for the identification of any information associated with the error in the PCIe device 214 to the BIOS engine 204 and/or other components in the computing device 200 (e.g., that may identify the PCIe device 214, that may identify a bus connecting the PCIe device 214, that may identify the type of error experienced by the PCIe device 214, etc.).

Figure 5:
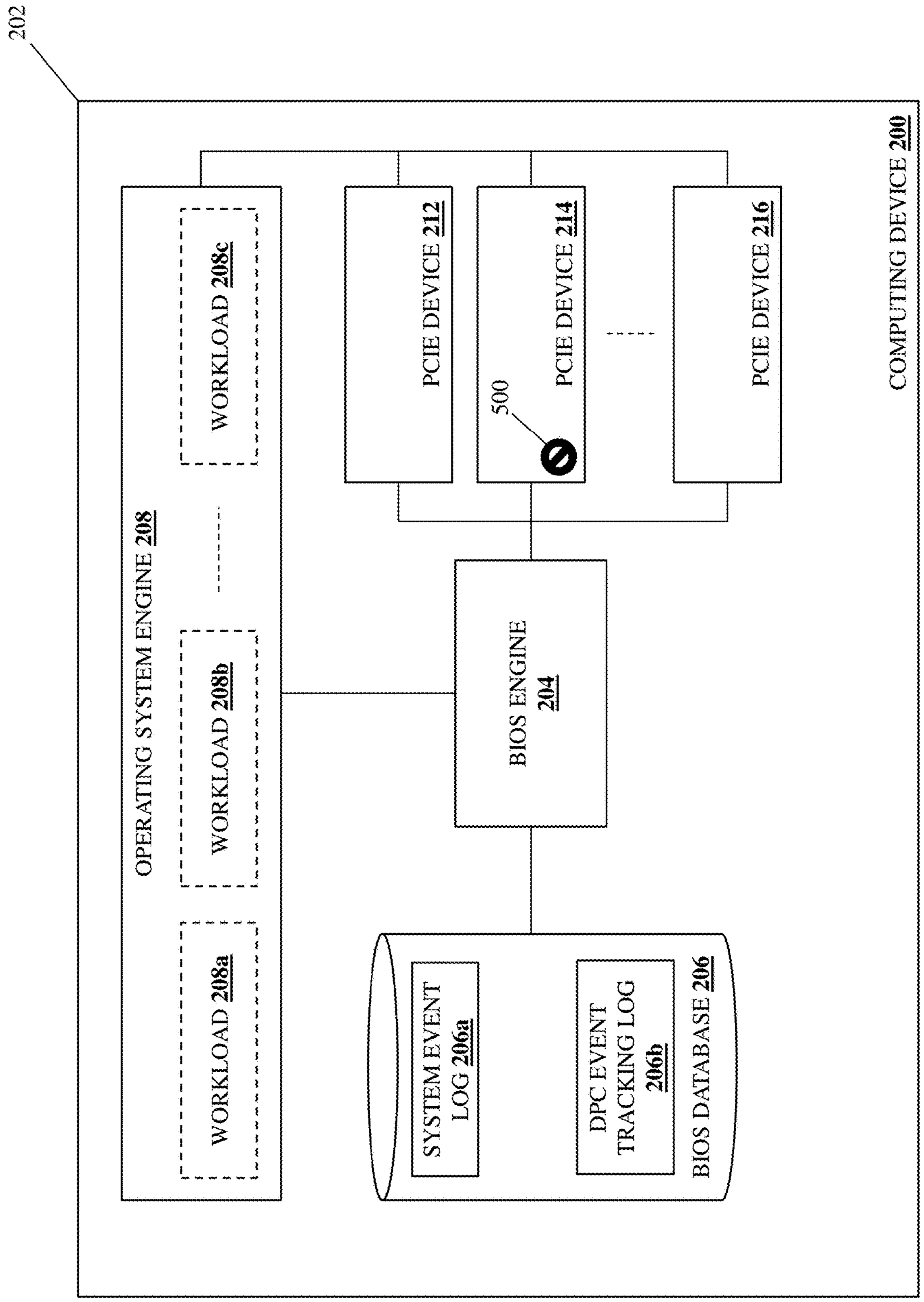
FIG. 5 is a schematic view illustrating an embodiment of the computing device of FIG. 2 operating during the method of FIG. 3.

For example, at block 304, the PCIe device 214 may detect the error in the PCI device 214 and, in response, report that error to a root port that is coupled to the PCIe device 214 and that is included in a chipset or other processing system in the computing device 200 as part of the DPC operations 402. In another example, a root port that is coupled to the PCIe device 214 and that is included in a chipset or other processing system in the computing device 200 may detect the error in the PCIe device 214 as part of the DPC device error identification operations 402. With reference to FIG. 5, in either of the embodiments discussed above and in response to receiving the report of the error in the PCIe device 214 or detecting the error in the PCIe device 214, the root port that is coupled to the PCIe device 214 and that is included in the chipset or other processing system in the computing device 200 may perform DPC operations that also include disabling a link to the PCIe device 214 (as indicated by element 500 in FIG. 5). However, while two specific examples are provided, one of skill in the art in possession of the present disclosure will appreciate how DPC operations may be performed in a variety of manners while remaining within the scope of the present disclosure as well.

The method 300 then proceeds to block 306 where a BIOS subsystem receives an SMI. In an embodiment, in either of the examples provided above and in response to receiving the report of the error in the PCIe device 214 or detecting the error in the PCIe device, at block 306 the root port that is coupled to the PCIe device 214 and that is included in the chipset or other processing system in the computing device 200 may generate an SMI that is received by the BIOS engine 204 in the computing device 200 and that one of skill in the art in possession of the present disclosure will appreciate will cause the computing device 200 to enter a System Management Mode (SMM) in which an operating mode of a central processing system (e.g., a x86 CPU) in the computing device 200 provides for the suspension of "normal" operations (e.g., the suspension of the operating system operations by the operating system engine 208 that provides for the performance of the workloads 208*a*-208*c* in the operating system) so that an alternate software system (e.g., the BIOS engine 204 provided by BIOS firmware, a hardware-assisted debugger, etc.) may be executed with relatively high privileges. As such, the DPC operations 402 discussed above that are performed in response to the error in the PCIe device 214 will result in an SMI the provides the computing device 200 in a SMM that suspends operation of the operating system engine 208 such that performance of the workloads 208*a*-208*c* in the operating system is suspended.

Figure 6:
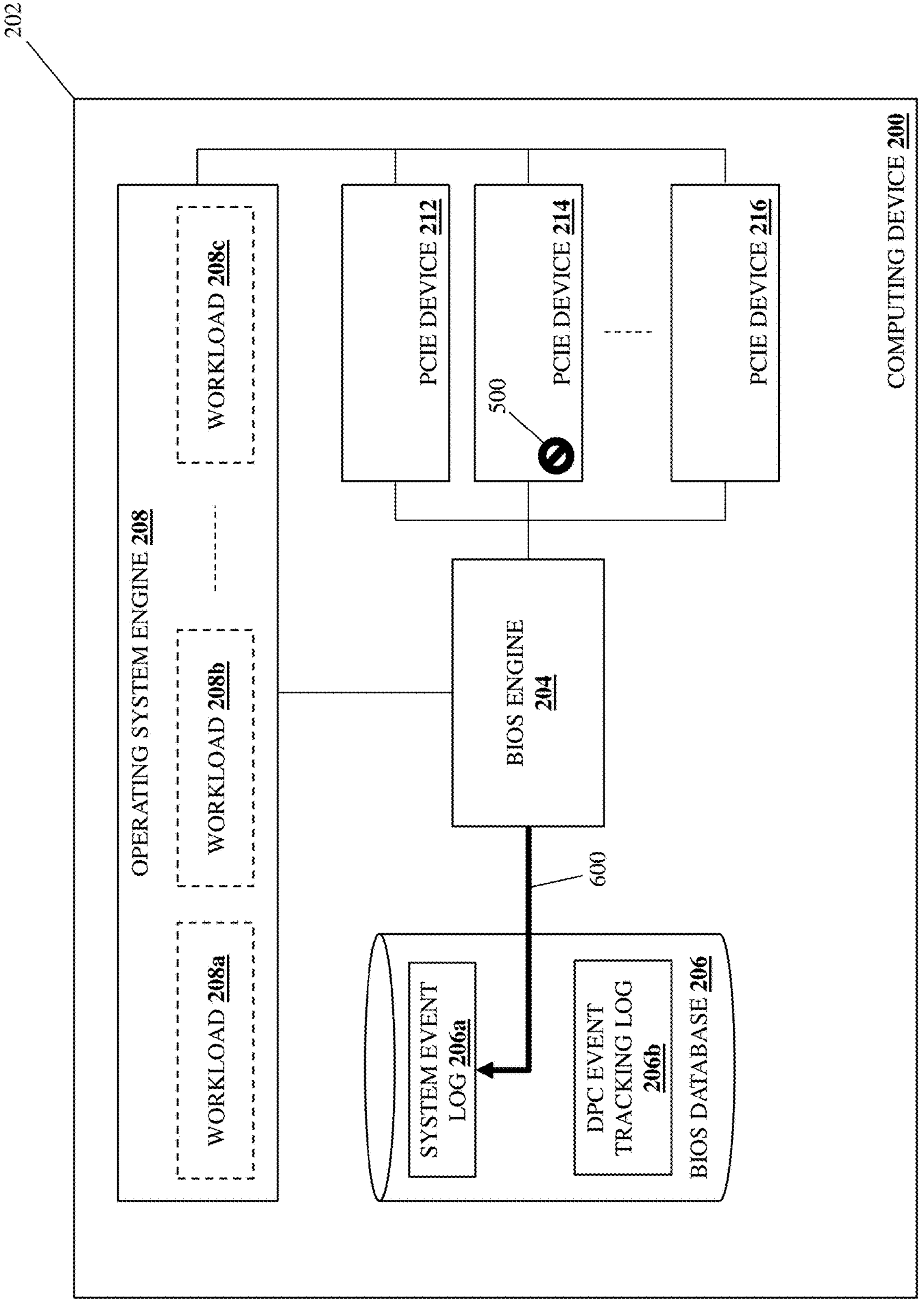
FIG. 6 is a schematic view illustrating an embodiment of the computing device of FIG. 2 operating during the method of FIG. 3.

The method 300 then proceeds to block 308 where the BIOS subsystem logs a DPC event. With reference to FIG. 6, in an embodiment of block 308 and in response to the SMI at block 306, the BIOS engine 204 in the computing device 200 (e.g., a DPC SMI handler in the BIOS engine 204) may perform DPC event logging operations 600 that may include logging any of a variety of DPC event information in the System Event Log (SEL) included in the BIOS database 206. While not described herein in detail, one of skill in the art in possession of the present disclosure will appreciate how the BIOS engine 204 may generate, retrieve, and/or otherwise identify any of a variety of conventional DPC event information about the PCIe device 214 and the error experienced by the PCIe device 214, and then log that conventional DPC event information in the SEL included in the BIOS database 206.

Figure 7:
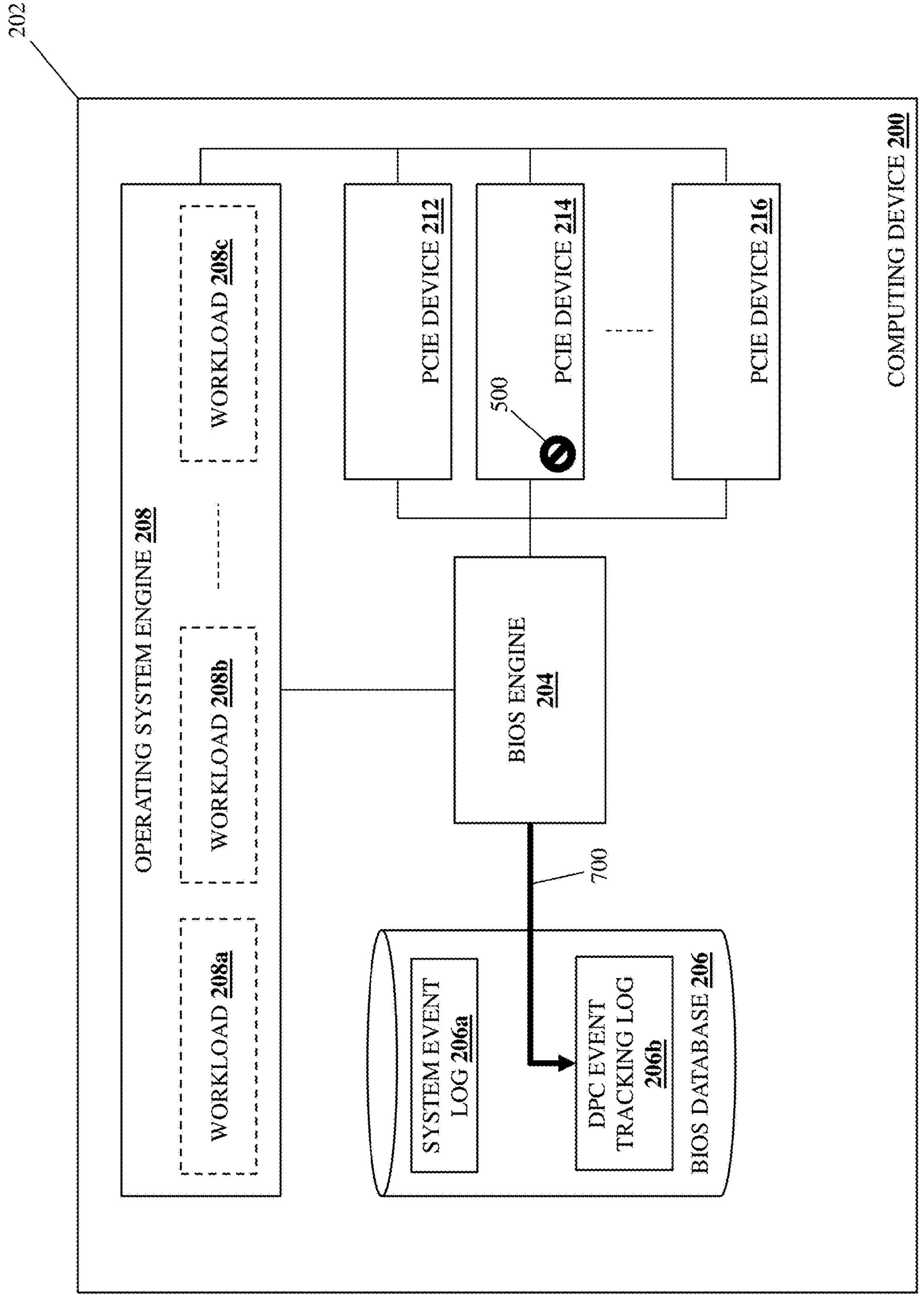
FIG. 7 is a schematic view illustrating an embodiment of the computing device of FIG. 2 operating during the method of FIG. 3.

The method 300 then proceeds to block 310 where the BIOS subsystem logs the SMI. With reference to FIG. 7, in an embodiment of block 310 and in response to the SMI at block 306, the BIOS engine 204 in the computing device 200 may perform SMI logging operations 700 that may include logging the occurrence of the SMI as part of the DPC operations 402 in the DPC event tracking log 206*b* included in the BIOS database 206. For example, in response to the generation of a first SMI in response to a first DPC operations that occurs initially following an error being experienced by the PCIe device 214, the BIOS engine 204 may initiate a DPC SMI counter in the DPC event tracking log 206*b* included in the BIOS database 206 as part of the SMI logging operations 700 at block 310 to identify that the SMI was generated in response to an error in the PCIe device 214, may record a timestamp that identifies a time that SMI was received, and/or may record any other DPC SMI information that would be apparent to one of skill in the art in possession of the present disclosure.

Furthermore, in response to the generation of any subsequent SMIs that are generated as part of any subsequent DPC operations that are included in a "DPC recovery loop" that is discussed in further detail below and that results from the error being experienced by the PCIe device 214, the BIOS engine 204 may increment the DPC SMI counter in the DPC event tracking log 206*b* included in the BIOS database 206 as part of the SMI logging operations 700 at block 310 to identify that the SMI was generated in response to an error in the PCIe device 214, may record a timestamp that identifies a time that SMI was received, and/or may record any other DPC SMI information that would be apparent to one of skill in the art in possession of the present disclosure. As such, one of skill in the art in possession of the present disclosure will appreciate how the logging of the SMI at block 310 provides for the tracking of a plurality of SMIs that may be generated as part of an "SMI storm" that can occur in a DPC recovery loop resulting from an error experienced by the PCIe device 214.

The method 300 then proceeds to decision block 312 where it is determined whether a number of SMIs has reached a DPC SMI storm threshold. In an embodiment, at decision block 312, the BIOS engine 204 in the computing device 200 may perform DPC SMI storm threshold determination operations that may include determining whether a number of SMIs generated in response to an error in a PCIe device has reached a DPC SMI storm threshold. For example, a DPC SMI storm threshold may be defined (e.g., by a manufacturer of the computing device 200, by a manufacturer of the PCIe device 214, etc.) that identifies a number of SMIs that, when generated within a particular time period in response to an error experienced by a particular PCIe device, qualifies as an "SMI storm". Furthermore, one of skill in the art in possession of the present disclosure will appreciate how the number of SMIs generated and/or time period in which that number of SMIs must be generated in response to an error experienced by a particular PCIe device to qualify as an SMI storm may vary depending on a variety of factors, and thus any of a variety of DPC SMI storm thresholds will fall within the scope of the present disclosure as well. Furthermore, while the number of SMIs generated and the time period in which SMIs are generated in response to an error experienced by a particular PCIe device are described as defining the DPC SMI storm threshold, one of skill in the art in possession of the present disclosure will appreciate how the DPC SMI storm threshold may be defined based on other factors while remaining within the scope of the present disclosure as well.

As such, at decision block 312, the BIOS engine 204 in the computing device 200 may determine whether the DPC SMI counter in the DPC event tracking log 206*b* included in the BIOS database 206 identifies a number of SMIs that have been generated in response to an error experienced by a particular PCIe device in a time period (e.g., based on the timestamps recorded for those SMIs) that exceeds the number of SMIs in the time period defined by the DPC SMI storm threshold. Furthermore, as discussed above, the BIOS engine 204 may determine whether a number of SMIs generated in response to an error being experienced by a PCIe device has reached a DPC SMI storm threshold based on other factors while remaining within the scope of the present disclosure as well.

Figure 8A:
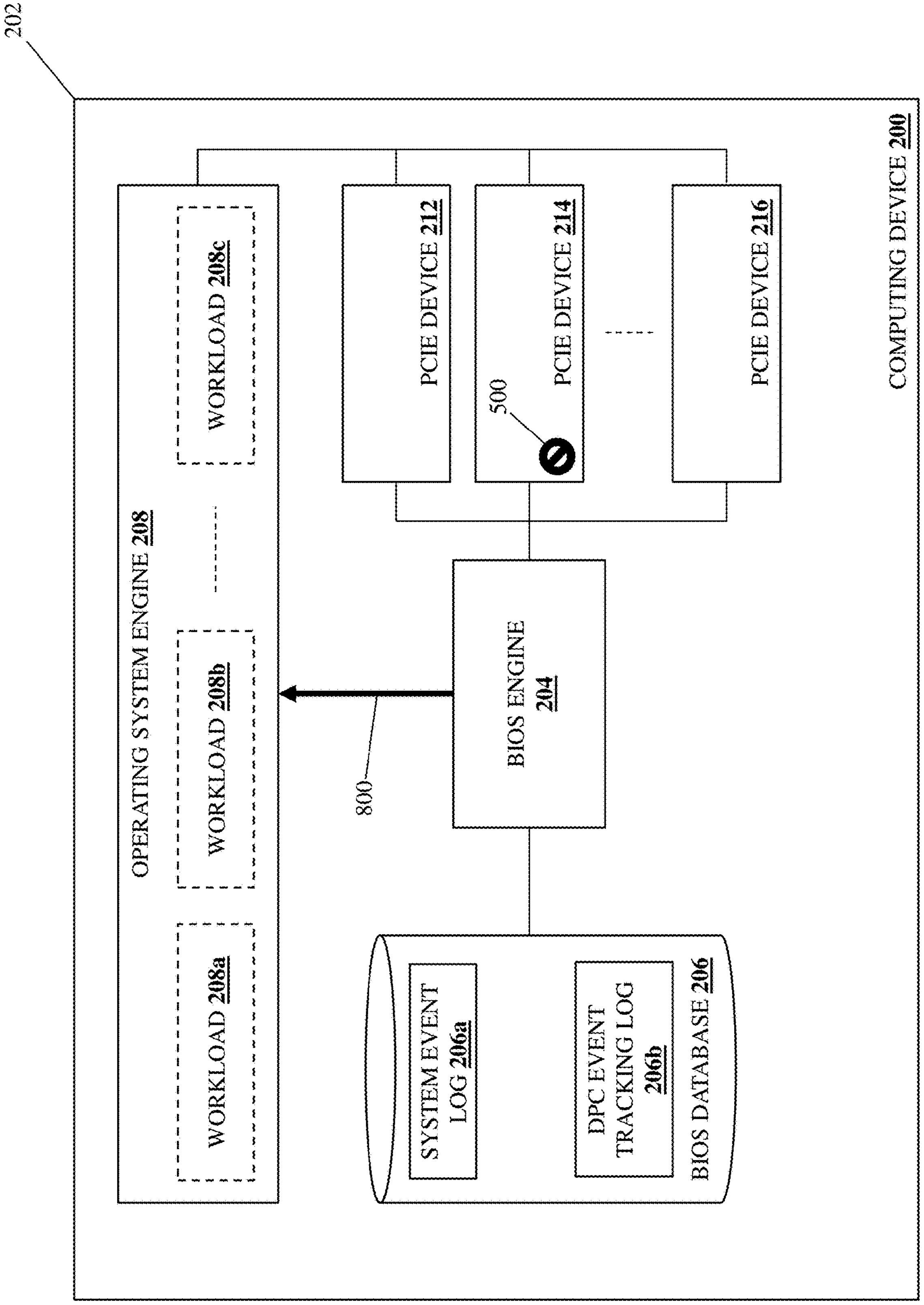
FIG. 8A is a schematic view illustrating an embodiment of the computing device of FIG. 2 operating during the method of FIG. 3.

If, at decision block 312, it is determined that the number of SMIs has not reached the DPC SMI storm threshold, the method 300 proceeds to block 314 where the BIOS subsystem causes an operating system to perform PCIe device recovery operations. With reference to FIG. 8A, in an embodiment of block 314, the BIOS engine 204 in the computing device 200 may perform PCIe device recovery instruction operations 800 that include transmitting an instruction to the operating system engine 208 to perform recovery operations on the PCIe device 214 that experienced the error. As will be appreciated by one of skill in the art in possession of the present disclosure, the instruction to perform recovery operations may identify the PCIe device 214, a bus connected to the PCIe device 214, and/or may include any other recovery operation instruction information that one of skill in the art in possession of the present disclosure would recognize as allowing an operating system to perform recovery operations on the PCIe device 214. Following the PCIe device recovery instruction operations 800, the BIOS engine 204 may transmit a request to the chipset in the processing system of the computing device 200 to exit or otherwise end the SMM, and in response the chipset in the processing system of the computing device 200 may exit or otherwise end the SMM such that the operation of the operating system engine 208 and the performance of the workloads 208*a*-208*c* in the operating system may be resumed.

Figure 8B:
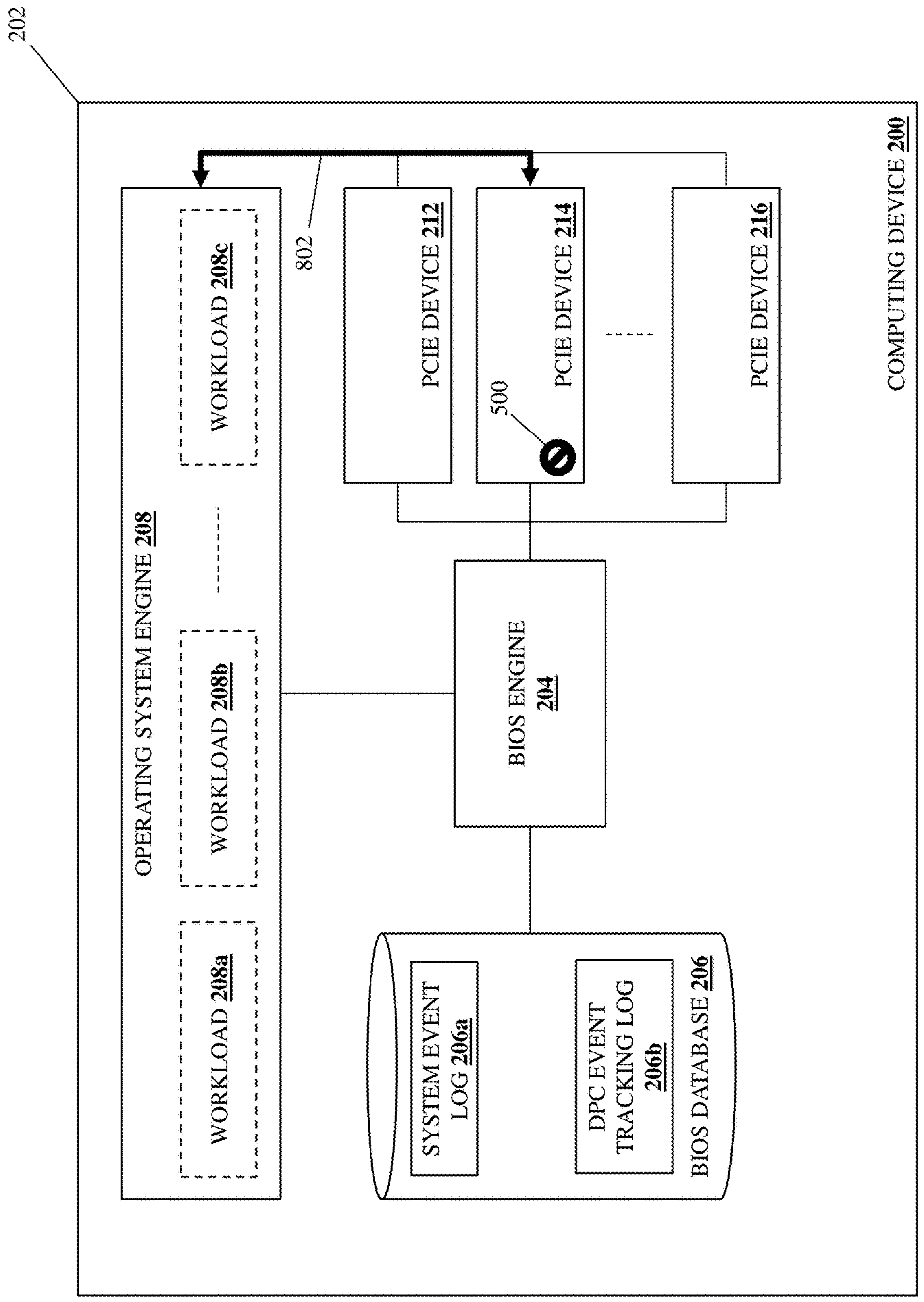
FIG. 8B is a schematic view illustrating an embodiment of the computing device of FIG. 2 operating during the method of FIG. 3.

With reference to FIG. 8B, in an embodiment of block 314 and in response to receiving the instruction to perform recovery operations (as well as the exiting/ending of the SMM), the operating system engine 208 may then perform PCIe device recovery operations 802 that may include performing any of a variety of PCIe device recovery operations that one of skill in the art in possession of the present disclosure would recognize may allow the PCIe device 214 to recover from the error. The method 300 then returns to decision block 302. As such, the method 300 may loop such that a DPC operation is performed each time an error is experienced in a PCIe device in the computing device 200, a corresponding SMI is generated, and the operating system engine 208 is caused to perform PCIe device recovery operations on that PCIe device as long as the number of SMIs generated in response to the error experienced by that PCIe device has not reached the DPC SMI storm threshold.

In the event the PCIe device recovery operations performed by the operating system engine 208 fail, one of skill in the art in possession of the present disclosure will appreciate how the method 300 may end, as such a PCIe device recovery operation failure may result in the operating system engine 208 performing conventional PCIe unrecoverable error operations that include making that PCIe device 214 unavailable, thus ending the generation of SMIs for that error experience by the PCIe device 214. However, one of skill in the art in possession of the present disclosure will appreciate how, in the event the error experienced by the PCIe device 214 discussed above is a "hard" error that may be temporarily recovered from via the PCIe device recovery operations by the operating system engine 208, a DPC recovery loop may be entered in which the method 400 repeatedly loops through blocks 302-314.

Figure 8C:
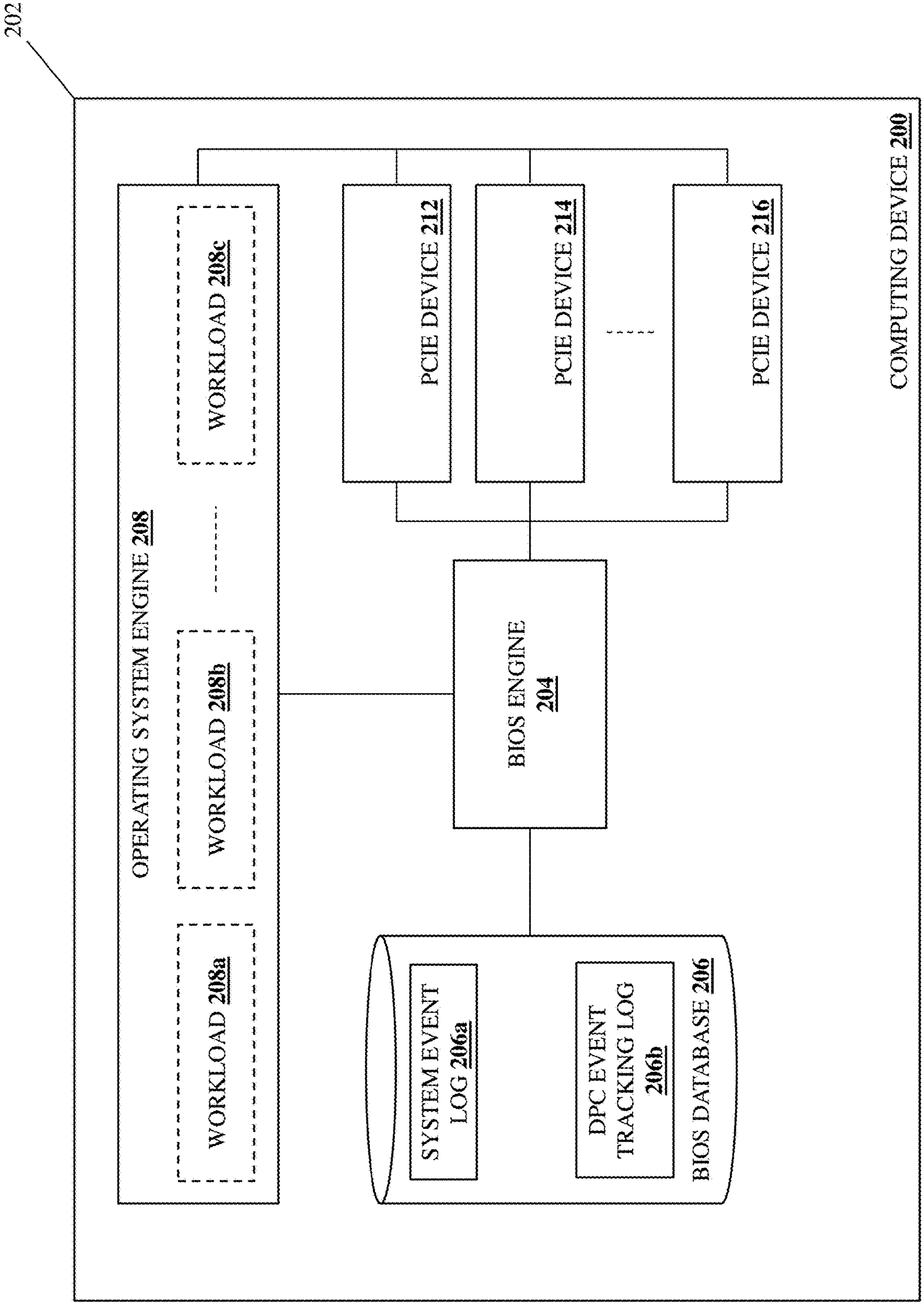
FIG. 8C is a schematic view illustrating an embodiment of the computing device of FIG. 2 operating during the method of FIG. 3.

For example, with reference to FIG. 8C and following successful PCIe device recovery operations by the operating system engine 208 at block 314, the operating system engine 208 may enable the link to the PCIe device 214 (as illustrated by the removal of the element 500 in FIG. 8C). However, subsequent to enablement of the link the PCIe device 214, the error will again be experienced by the PCIe device 214 (e.g., due to that error being a "hard" error), resulting in the performance of blocks 302-314 again, and with that process repeating to provide a DPC recovery loop that results in an SMI storm due to the repeated generation of respective SMIs at each performance of block 310. However, as will be appreciated by one of skill in the art in possession of the present disclosure, decision block 312 of the method 300 allows the BIOS engine 204 in the computing device 200 to recognize and prevent further DPC recovery loops to end the SMI storm.

Figure 9A:
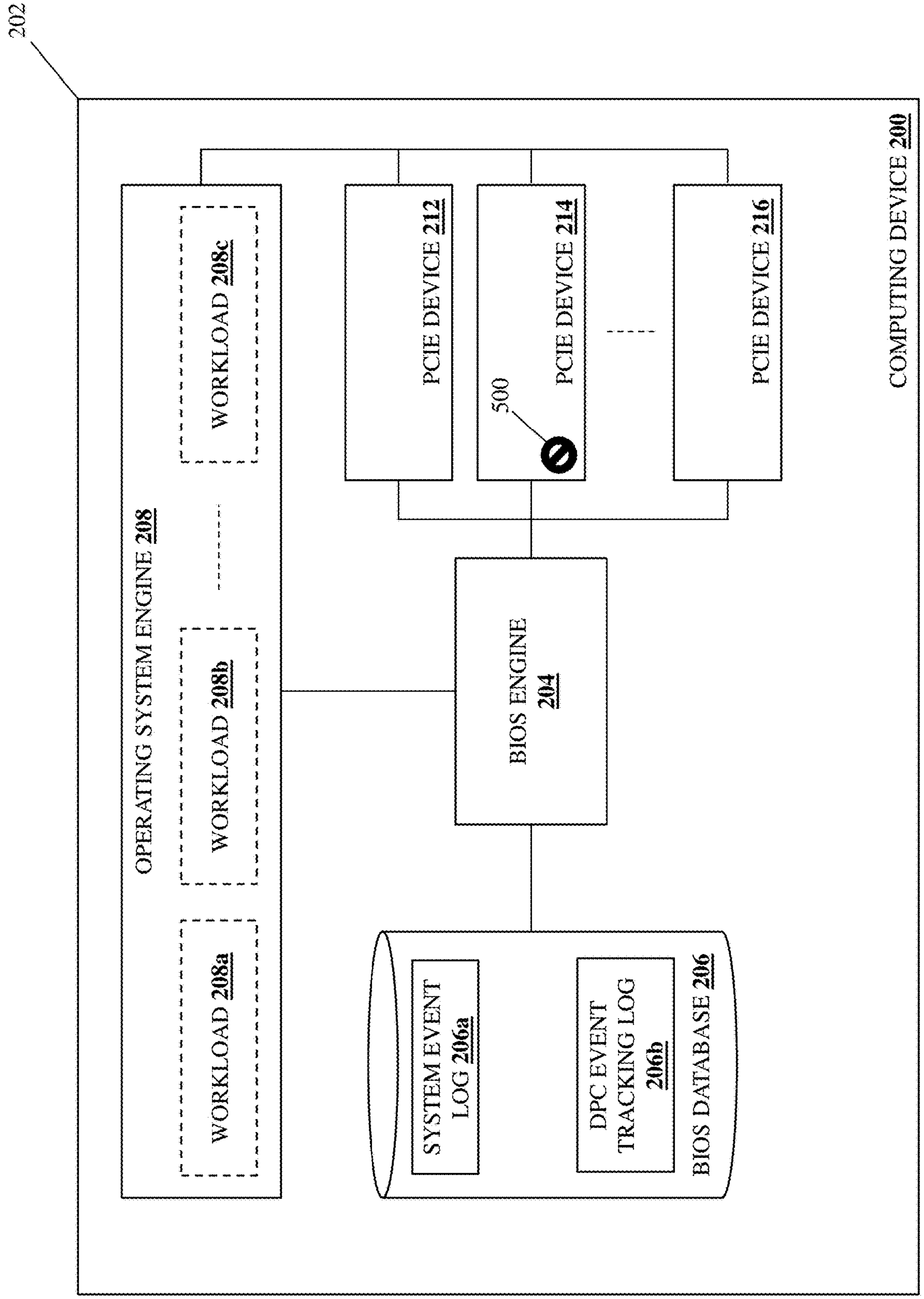
FIG. 9A is a schematic view illustrating an embodiment of the computing device of FIG. 2 operating during the method of FIG. 3.

For example, if at decision block 312 it is determined that the number of SMIs has reached the DPC SMI storm threshold, the method 300 proceeds to block 316 where the BIOS subsystem prevents use the link to the PCIe device and prevents the operating system from performing PCIe device recovery operations. With reference to FIG. 9A, in an embodiment of block 316, the BIOS engine 204 in the computing device 200 may prevent the use of the link to the PCIe device 214 via a "software" DPC operation that may include, for example, writing to a DPC control register in a root port of a processing system that is coupled to the PCIe device 214 in order to disable the link to the PCIe device 214 (as indicated by element 500 in FIG. 9A).

As will be appreciated by one of skill in the art in possession of the present disclosure, the link to the PCIe device 214 will have already been disabled (e.g., by the root port in the processing system of the computing device 200 at block 304) prior to the BIOS engine 204 determining that the number of SMIs has reached the DPC SMI storm threshold at decision block 312, and thus the writing to the DPC control register in that root port will provide for the disabling of that link to the PCIe device 214 such that the operating system engine 208 cannot "see" that link/PCIe device 214 and thus cannot subsequently enable it. Furthermore, the BIOS engine 204 may also prevent the operating system from performing PCIe device recovery operations by not transmitting any further instructions to the operating system engine 208 to perform PCIe device recovery operations, and one of skill in the art in possession of the present disclosure will appreciate how the disabling of the link to the PCIe device 214 by the BIOS engine 204 will ensure that the PCIe device 214 is not visible to the operating system when, for example, a PCIe bus is enumerated in response to a hotplug interrupt that may result in response to the disabling of the link to the PCIe device 214 (e.g., in computing devices that are hotplug capable), or in response to a device check notification (e.g., in computing devices that are not hotplug capable). However, while a specific example has been provided, one of skill in the art in possession of the present disclosure will appreciate how the link to a PCIe device experiencing an error that results in an SMI storm may be disabled and PCIe device recovery operations by an operating system may be prevented in a variety of manners that will fall within the scope of the present disclosure as well.

Figure 9B:
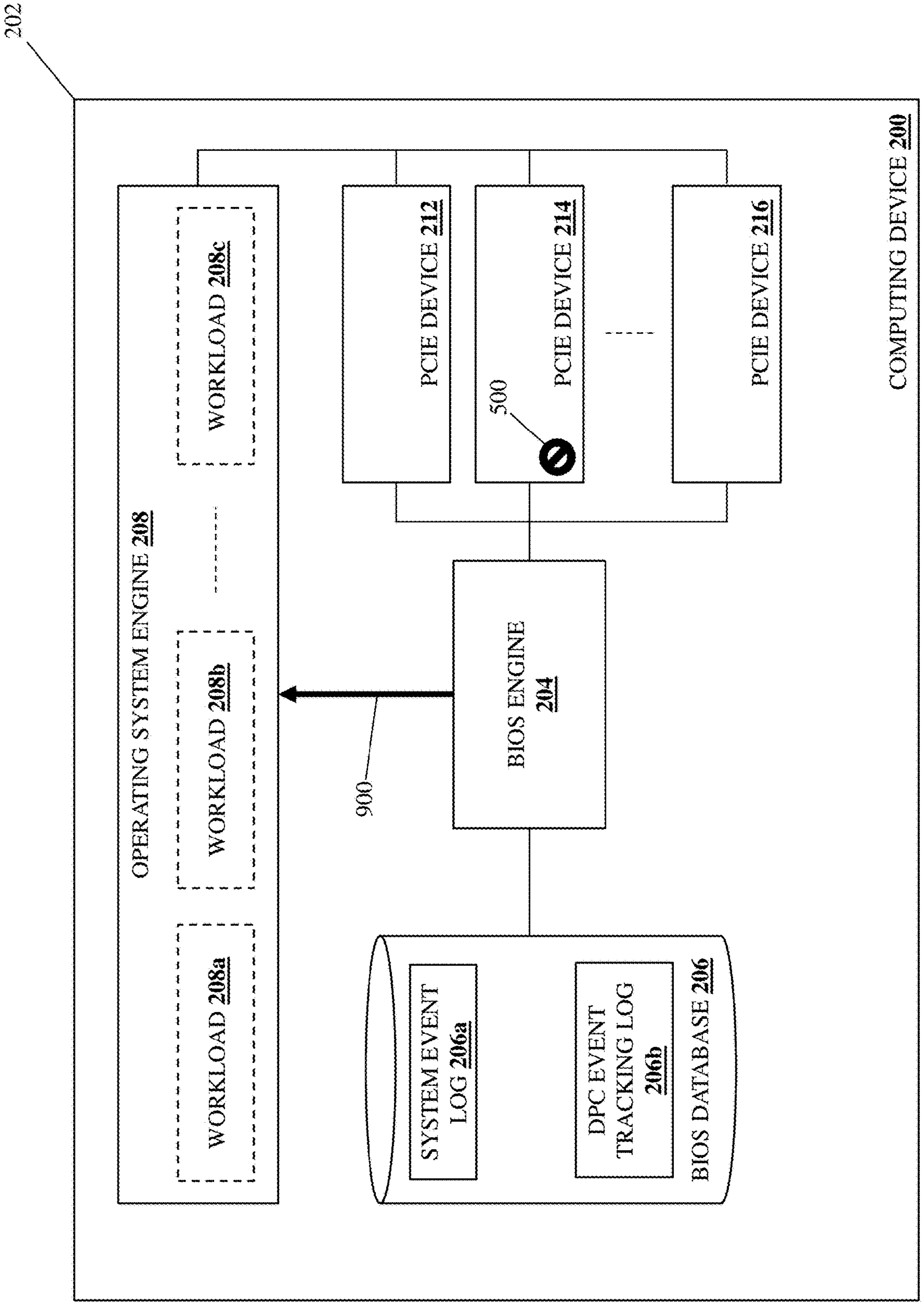
FIG. 9B is a schematic view illustrating an embodiment of the computing device of FIG. 2 operating during the method of FIG. 3.

The method 300 then proceeds to block 318 where the operating system performs PCIe device renumeration operations. With reference to FIG. 9B, in an embodiment of block 318, the BIOS engine 204 in the computing device 200 may perform PCIe device renumeration instruction operations 900 that may include transmitting an instruction to the operating system engine 208 to perform PCIe device re-enumeration operations on PCIe devices included in the computing device 200. For example, the instruction to perform PCIe device re-enumeration operations may be provided by a PCIe device check instruction that is configured to cause the operating system engine 208 to perform PCIe device check operations that re-enumerate the PCIe devices 212 and up to 216 (but not the unavailable PCIe device 214), and/or a PCIe bus check instruction that is configured to cause the operating system engine 208 to perform PCIe bus check operations that re-enumerate the PCIe devices 212 and up to 216 (but not the unavailable PCIe device 214).

As will be appreciated by one of skill in the art in possession of the present disclosure, the instruction to perform PCIe device re-enumeration operations discussed above may be provided by the BIOS engine 204 to the operating system engine 208 in embodiments in which the computing device 200 is not configured to allow hot-plugging of PCIe devices, as such hot-plugging functionality may allow the re-enumeration of the remaining available PCIe devices by the operating system engine 208 without the need for instructions to do so by the BIOS engine 204. The method 300 then returns to decision block 302. As such, in the event an SMI storm is detected that results from an error experience by a PCIe device, that PCIe device may be made unavailable (e.g., by disabling the link to that PCIe device in the examples described above), and the operating system engine 208 may re-enumerate the remaining available PCIe devices in the computing device for subsequent use.

Thus, systems and methods have been described that track a number of SMIs received as part of DPC operations by a PCIe device, and disable a link to that PCIe device while preventing further recovery operations on the PCIe device by an operating system in the event that number of SMIs exceeds a threshold. For example, the PCIe DPC SMI storm prevention system of the present disclosure may include a BIOS subsystem coupled to a first PCIe device. In response to an error being experienced in the first PCIe device and causing the first PCIe device to perform DPC operations, the BIOS subsystem receives a plurality of SMIs that are each configured to begin a SMM. The BIOS subsystem tracks a number of the plurality of SMIs in a BIOS database and determines when the number of the plurality of SMIs has reached a DPC SMI storm threshold. In response to the number of the plurality of SMIs reaching the DPC SMI storm threshold, the BIOS subsystem prevents use of a link to the first PCIe device and prevents an operating system from performing recovery operations to recover the first PCIe device from the error. As such, DPC recovery loops that can result in SMI storms are prevented, thus eliminating associated operating system issues that can reduce the performance of a computing device.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A Peripheral Component Interconnect express (PCIe) error handling system, comprising:
- a first Peripheral Component Interconnect express (PCIe) device;
- an initialization subsystem that is coupled to the first PCIe device and that is configured to:
  - receive, in response to an error being experienced in the first PCIe device, a plurality of interrupts that are each configured to initiate an error handling mode;
  - track a number of the plurality of interrupts; and
  - determine that the number of the plurality of interrupts has reached an interrupt threshold and, in response, prevent use of a link to the first PCIe device and prevent the performance of recovery operations to recover the first PCIe device from the error.

2. The system of claim 1, wherein the initialization subsystem is configured to:
- record, for each of the plurality of interrupts received from the first PCIe device, a respective timestamp for that interrupt.

3. The system of claim 1, wherein the initialization subsystem is configured to:
- prevent the use of the link to the first PCIe device by writing to a control register in a root port of a processing system that is coupled to the first PCIe device to disable the link to the first PCIe device.

4. The system of claim 1, wherein the initialization subsystem is configured to:
- transmit a PCIe device check instruction to cause re-enumeration of second PCIe devices that are coupled to the initialization subsystem.

5. The system of claim 1, wherein the initialization subsystem is configured to:
- transmit a PCIe bus check instruction to cause re-enumeration of second PCIe devices that are coupled to the initialization subsystem.

6. The system of claim 1, wherein the initialization subsystem is configured, in response to receiving each of the plurality of interrupts, to:
- log a respective error event; and
- transmit a respective recovery operation instruction to cause the performance of the recovery operations to recover the PCIe device from the error.

7. An Information Handling System (IHS), comprising:
- a processing system; and
- a memory system that is coupled to the processing system and that includes instructions that, when executed by the processing system, cause the processing system to provide an initialization engine that is configured to:
  - receive, in response to an error being experienced in a first PCIe device, a plurality of interrupts that are each configured to initiate an error handling mode;
  - track a number of the plurality of interrupts; and
  - determine that the number of the plurality of interrupts has reached an interrupt threshold and, in response, prevent use of a link to the first PCIe device and prevent the performance of recovery operations to recover the first PCIe device from the error.

8. The IHS of claim 7, wherein the initialization engine is configured to:
- record, for each of the plurality of interrupts received from the first PCIe device, a respective timestamp for that interrupt.

9. The IHS of claim 7, wherein the initialization engine is configured to:
- prevent the use of the link to the first PCIe device by writing to a control register in a root port of the processing system to disable the link to the first PCIe device.

10. The IHS of claim 7, wherein the initialization engine is configured to:
- transmit a PCIe device check instruction to cause re-enumeration of second PCIe devices that are coupled to the processing system.

11. The IHS of claim 7, wherein the initialization engine is configured to:
- transmit a PCIe bus check instruction to cause re-enumeration of second PCIe devices that are coupled to the processing system.

12. The IHS of claim 7, wherein the initialization engine is configured, in response to receiving each of the plurality of interrupts, to:
- log a respective error event; and
- transmit a respective recovery operation instruction to cause the performance of the recovery operations to recover the PCIe device from the error.

13. The IHS of claim 7, wherein each of the plurality of interrupts is received in a respective error recovery loop that is caused by a hard error that provides the error being experienced in the first PCIe device.

14. A method for handling Peripheral Component Interconnect express (PCIe) device errors in a computing device, comprising:

receiving, by an initialization subsystem in response to an error being experienced in a first PCIe device, a plurality of interrupts that are each configured to initiate an error handling mode;

tracking, by the initialization subsystem, a number of the plurality of interrupts; and determining, by the initialization subsystem, that the number of the plurality of interrupts has reached an interrupt threshold and, in response, preventing use of a link to the first PCIe device and preventing the performance of recovery operations to recover the first PCIe device from the error.

15. The method of claim 14, further comprising:

recording, by the initialization subsystem for each of the plurality of interrupts received from the first PCIe device, a respective timestamp for that interrupt.

16. The method of claim 14, further comprising:

preventing, by the initialization subsystem, the use of the link to the first PCIe device by writing to a control register in a root port of a processing system that is coupled to the first PCIe device to disable the link to the first PCIe device.

17. The method of claim 14, further comprising:

transmitting, by the initialization subsystem, a PCIe device check instruction to cause the re-enumeration of second PCIe devices that are coupled to the initialization subsystem.

18. The method of claim 14, further comprising:

transmitting, by the initialization subsystem, a PCIe bus check instruction to cause the re-enumeration of second PCIe devices that are coupled to the initialization subsystem.

19. The method of claim 14, further comprising:

logging, by the initialization subsystem in response to receiving each of the plurality of interrupts, a respective error event; and transmitting, by the initialization subsystem in response to receiving each of the plurality of interrupts, a respective recovery operation instruction to cause the performance of the recovery operations to recover the PCIe device from the error.

20. The method of claim 14, wherein each of the plurality of interrupts is received in a respective error recovery loop that is caused by a hard error that provides the error being experienced in the first PCIe device.

* * * * *